US007221656B1

(12) United States Patent
Aweya et al.

(10) Patent No.: US 7,221,656 B1
(45) Date of Patent: May 22, 2007

(54) TECHNIQUE FOR IMPLEMENTING AN ADMISSION CONTROL SCHEME FOR DATA FLOWS

(75) Inventors: James Aweya, Kanata (CA); Michel Ouellette, Plantagenet (CA); Delfin Y. Montuno, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1082 days.

(21) Appl. No.: 10/172,981

(22) Filed: Jun. 18, 2002

(51) Int. Cl.
  *H04J 1/16* (2006.01)
  *G08C 15/00* (2006.01)
(52) U.S. Cl. .............. 370/252; 370/412; 370/395.41; 370/429; 370/229; 370/230; 370/230.1; 370/231; 370/232
(58) Field of Classification Search .............. None
  See application file for complete search history.

(56) References Cited

U.S. PATENT DOCUMENTS 4,787,082 A * 11/1988 Delaney et al. ............ 370/216
6,333,917 B1 * 12/2001 Lyon et al. ................. 370/236

OTHER PUBLICATIONS

S. McCreary et al., "Trends in Wide Area IP Traffic Patterns: A View from the Ames Internet eXchange," Proc. ITC Specialist Seminar on IP Traffic, Monterey, CA, USA, 2000, 26 pages.
C. Villamizar et al., "High Performance TCP in ANSNET," acm Computer Commun. Rev., vol. 24, No. 5, Oct. 1995, pp. 1-16.
R. Morris, "TCP Behavior with Many Flows," IEEE Int'l Conf. Network Protocols, Atlanta, GA, Oct. 1997, pp. 205-211.
R. Morris, "Scalable TCP Congestion Control," Proc. IEEE INFOCOM 2000, pp. 1176-1183.
V. Jacobson, "Congestion Avoidance and Control," Proc. ACM SIGCOMM'88, Aug. 1988, pp. 314-329.
K. Fall et al., "Simulation-based Comparisons of Tahoe, Reno and STACK TCP," ACM Computer Commun. Rev., vol. 26, No. 3, Jul. 1996, pp. 5-21.
L. S. Brakmo et al., "TCP Vegas: End to End Congestion Avoidance on a Global Internet," IEEE Jour. on SELECTED Areas in Commun., vol. 13, No. 8, Oct. 1995, pp. 1465-1480.
S. Floyd et al., "Random Early Detection Gateway for Congestion Avoidance," IEEE/ACM Trans. Networking, vol. 1, No. 4, Aug. 1993, pp. 397-413.

(Continued)

*Primary Examiner*—Chi Pham
*Assistant Examiner*—Raj K. Jain
(74) *Attorney, Agent, or Firm*—Hunton & Williams LLP

(57) ABSTRACT

A technique for implementing an admission control scheme for data flows is disclosed. In one embodiment, the technique is realized by determining a current error value in response to a queue size in a packet buffer; generating a packet drop probability based at least in part on the current error value; receiving a data packet having a data type; and determining whether to reject or accept the received data packet at a queue based at least in part on the packet drop probability and a predetermined flow rejection threshold. In addition, the technique may involve determining whether a randomly generated number is less than or equal to the packet drop probability and determining whether a count variable is greater than or equal to an inter-drop interval.

18 Claims, 8 Drawing Sheets

OTHER PUBLICATIONS

B Braden et al., "Recommendation on Queue Management and Congestion Avoidance in the Internet," IETF RFC 2309, Apr. 1998, pp. 1-17.

L. Massoulie et al., "Arguments in Favour of Admission Control for TCP Flows," Proc. ITC 16, Edinburgh, UK, 1999, pp. 1-12.

A. Kumar et al., "Nonintrusive TCP Connection Admission Control for Bandwidth Management of an Internet Access Link," IEEE Commun. Mag., vol. 38, Issue 5, May 2000, pp. 160-167.

R. Mortier et al., "Implicit Admission Control," IEEE Jour. Selected AREAS Commun., vol. 18, No. 12, Dec. 2000, pp. 2629-2639.

ATM Forum, Traffic Management Specification, Version 4, ATM Forum/95-0013R8, 1995.

G. Kesidis et al., "Effective bandwidths for multiclass Markov fluids and other ATM sources," IEEE/ACM Trans. on Networking, vol. 1, No. 4, Aug. 1993, pp. 424-428.

A. Elwalid et al., "A new approach for allocating buffers and bandwidth to heterogenous, regulated traffic in an ATM node," IEEE Journal on Selected Areas in Commun., vol. 13, No. 6, Aug. 1995, pp. 1115-1127.

J. Aweya et al., "A Control Theoretic Approach to Active Queue Management," Computer Networks, vol. 36, Issue 2-3, Jul. 2001, pp. 203-235.

J. Aweya et al., "An Optimization-Oriented View Random Early Detection," Computer Communications, vol. 24, Issue 12, Jul. 2001, pp. 1170-1187.

T. J. Ott et al., "SRED: Stabilized RED," Proc. IEEE INFOCOM'99, NY, Mar. 21-25, 1999, pp. 1346-1355.

W. Feng et al., "BLUE: A New Class of Active Queue Management Algorithms," Technical Report CSE-TR-387-99, Dept. of EECS, University of Michigan, Apr. 1999, pp. 1-27.

S. Floyd, "Connections with Multiple Congested Gateways in Packet-Switched Networks Part 1: One-way Traffic," ACM Computer Commun. Rev., vol. 21, No. 5, Oct. 1991, 18 pages.

M. Mathis et al., "The Macroscopic Behavior of the TCP Congestion Avoidance Algorithm," ACM Computer Commun. Rev., vol. 27, No. 3, Jul. 1997, 16 pages.

J. Padhye et al., "Modeling TCP Throughput: A Simple Model and its Empirical Validation," Proc. SIGCOMM'98, Vancouver, Canada, Sep. 1998, pp. 303-314.

G. F. Franklin et al., "Feedback Control of Dynamic Systems," Addison-Wesley Reading, Massachusetts, 1994, 15 pages.

* cited by examiner

TECHNIQUE FOR IMPLEMENTING AN ADMISSION CONTROL SCHEME FOR DATA FLOWS

FIELD OF THE INVENTION

The present invention relates generally to an admission control scheme and, more particularly, to a technique for implementing an admission control scheme for data flows.

BACKGROUND OF THE INVENTION

Due to limited networking resources in many of today's Internet Protocol (IP) networks, sporadic and periodically sustained congestion occurs. In addition, as the number of competing flows increases, the ability of Transmission Control Protocol (TCP) flows to share a bottleneck link fairly and efficiently decreases. High packet losses experienced by TCP flows also cause long and unpredictable delays as a result of TCP timeouts. Thus, most congestion control mechanisms strive to maintain high network utilization, avoid network overload, and thus avoid high queuing delays and packet loss.

IP provides a high degree of flexibility in building large and arbitrary complex networks. The ubiquitous, multi-service, connectionless, cross-platform nature of IP has contributed to the success of the Internet. A recent rise in usage and popularity of IP networks (e.g., the Internet) has been paralleled by a rise in user expectations regarding the quality of services offered by these networks. Unfortunately, due to limited networking resources (e.g., bandwidth, buffer space, etc.) in many networks, sporadic and periodically sustained congestion is imminent.

Consequently, service providers need to not only evolve their networks to higher speeds, but they also need to plan for new services and mechanisms to address varied requirements of different customers. At the same time, service providers would like to maximize sharing of costly network infrastructure by controlling the usage of network resources in accordance with service pricing and revenue potential. A rapidly rising bandwidth demand and a rising need for service quality have resulted in efforts to define mechanisms for efficient network control and service delivery.

A major part of the traffic transported in today's Internet is elastic traffic, particularly those from TCP applications. TCP flows are connection-oriented in nature and elastic in resource requirements. Elasticity stems from TCP's ability to utilize a network bottleneck, adapting quickly to changes in offered load or available bandwidth. However, TCP's ability to share a bottleneck link fairly and efficiently decreases as the number of flows increases. For example, performance of TCP becomes significantly degraded when the number of active TCP flows exceeds a network's bandwidth-delay product measured in packets. In this case, congestion occurs due to contention for limited network resources (e.g., bandwidth, buffer space, etc.). If this situation is not detected and prevented, congestion collapse may occur where a network is loaded to such a level that data goodput (e.g., which may be defined as throughput minus retransmissions) falls to almost zero.

A large number of flows may lead to high network utilization, but it is important to note that high network utilization is only good when packet loss rate is low. This is because high packet loss rates can negatively impact overall network and end-user performance. For example, a lost packet consumes network resources before it is dropped, thereby impacting efficiency in other parts of a network. A high packet loss rate also causes long and unpredictable delays as a result of TCP timeouts. It is therefore desirable to achieve high network utilization with low packet loss rates.

Although current TCP end-system control mechanisms may address network congestion, a TCP flow may still achieve near zero goodput when a large number of flows share a bottleneck link. Also, with a network heavily loaded with a large number of flows, current network-based control mechanisms may reach their limits of useful intervention to prevent excessive packet loss or even congestion collapse.

These reasons, among others, suggest the need for controlling the number of TCP flows in a network. Mechanisms for overload control in IP networks may involve per-connection TCP admission control. An admission control for TCP flows may be achieved without changing the end-system protocol stacks by either intercepting (e.g., dropping) TCP connection setup (SYN) packets in the network or sending artificial TCP connection reset (RST) packets to end systems. The RST based approach has the disadvantage of potentially faster application level retries, for example.

Admission control, in general, checks whether admitting a flow would reduce service quality of existing flows, or whether an incoming flow's quality of service (QoS) requirements can not be met. Admission control may play a crucial role in ensuring that a network meets a user's QoS requirements.

Overall network user utility may be increased by increasing network capacity (via switch, router and link capacities, for example), or by implementing an intelligent traffic management mechanism (e.g., admission control, active queue management (AQM)). Another option may involve over-provisioning a network so that under natural conditions the network is rarely overloaded. However, when there is a focused overload to part of a network (e.g., when a popular web site is heavily accessed, or some event not accounted for in traffic engineering happens), network devices (e.g., switches, routers) must have mechanisms to control resource usage. When such events happen, there are not enough resources available to give reasonable service to all users. Over-provisioning network bandwidth and keeping the network lightly loaded in order to support adequate service quality is not a cost-effective solution and cannot be achieved at all times.

In addition, a popular web-site may be flooded with web browser hits due to a promotional, sporting or other "news-breaking" event. Thus, users are left with either accepting a significant service degradation or the service provider has to increase investment on over-provisioning bandwidth. This gives rise to a key question of who would pay for increased capacity associated with over-provisioning bandwidth. As e-commerce becomes a highly competitive market, service providers who attempt to over-provision in the place of using admission control may not be cost-effective. The service providers who gain performance and reliability while keeping costs down are the ones who gain a competitive edge in the marketplace.

Current schemes propose use of various forms of on-line estimates of the number of active flows or the bandwidth of flows to make admission control decisions. Particularly, some current schemes use total transmission bandwidth, an estimated aggregate arrival rate and a buffer size to determine when the admission of a new flow is likely to cause a target overflow probability to be exceeded. However, these schemes do not provide a tight integration of AQM into TCP admission control thereby resulting in inefficient control of TCP flows. Incorporating AQM in TCP admission control provides the advantage of throttling the rate of a TCP connecting setup in addition to the ability to detect incipient congestion early and convey this information to the end systems. AQM schemes drop incoming packets in a random probabilistic manner where the probability is a function of recent buffer fill. An objective is to provide a more equitable distribution of packet loss, avoid the synchronization of flows, and at the same time improve the utilization of the network. The drop probabilities reflect actual network behavior and provide simple measurable and controllable quantities for admission control. The use of on-line measurements and estimation derived from AQM for admission control is appealing because of its simplicity and the ability to deal with sources that cannot be characterized. It allows admission control be built on top of AQM. The scheme does not require additional measurements or accounting beyond those needed for AQM.

In view of the foregoing, it would be desirable to provide a technique for implementing an admission control scheme for TCP flows which overcomes the above-described inadequacies and shortcomings of current schemes. More particularly, it would be desirable to provide a technique for implementing an admission control scheme for TCP flows that efficiently integrates AQM in a cost effective manner.

SUMMARY OF THE INVENTION

According to the present invention, a technique for implementing an admission control scheme for data flows is provided. In one exemplary embodiment, the technique is realized by a method for implementing an admission control scheme for data flows comprising the steps of: determining a current error value in response to a queue size in a packet buffer; generating a packet drop probability based at least in part on the current error value; receiving a data packet having a data type; and determining whether to reject or accept the received data packet at a queue based at least in part on the packet drop probability and a predetermined flow rejection threshold.

In accordance with other aspects of this exemplary embodiment of the present invention, the data type indicates an initialization of a data flow; the method further comprises the step of determining whether the packet drop probability is greater than or equal to the predetermined flow rejection threshold; the packet drop probability is used to control congestion associated with the queue; the queue size is maintained at a predetermined queue threshold; the method further comprises the step of sending a signal to at least one source of the data packet to reduce an associated sending rate; the method further comprises the step of determining whether a randomly generated number is less than or equal to the packet drop probability; the method further comprises the step of determining whether a count variable is greater than or equal to an inter-drop interval; and the inter-drop interval comprises an inverse of the packet drop probability.

In accordance with further aspects of this exemplary embodiment of the present invention, a computer signal embodied in a carrier wave readable by a computing system and encoding a computer program of instructions for executing a computer process performing the method recited above.

In another exemplary embodiment of the present invention, a system for implementing an admission control scheme for data flows comprises an active queue management module for determining a current error value in response to a queue size in a packet buffer and for generating a packet drop probability based at least in part on the current error value; a packet receiver for receiving a data packet having a data type; and an admission control module for determining whether to reject or accept the received data packet at a queue based at least in part on the packet drop probability and a predetermined flow rejection threshold.

In accordance with other aspects of this exemplary embodiment of the present invention, the data type indicates an initialization of a data flow; the admission control module determines whether the packet drop probability is greater than or equal to the predetermined flow rejection threshold; the packet drop probability is used to control congestion associated with the queue; the queue size is maintained at a predetermined queue threshold; a signal is sent to at least one source of the data packet to reduce an associated sending rate; the system further comprises a random number generator for generating a random number and a drop decision logic for determining whether the random number is less than or equal to the packet drop probability; the system further comprises an inter-drop interval computed from the packet drop probability; and a drop decision logic for determining whether a count variable is greater than or equal to the inter-drop interval; and the inter-drop interval comprises an inverse of the packet drop probability.

In another exemplary embodiment of the present invention, an article of manufacture for implementing an admission control scheme for data flows comprises at least one processor readable carrier; and instructions carried on the at least one carrier; wherein the instructions are configured to be readable from the at least one carrier by at least one processor and thereby cause the at least one processor to operate so as to: determine a current error value in response to a queue size in a packet buffer; generate a packet drop probability based at least in part on the current error value; receive a data packet having a data type; and determine whether to reject or accept the received data packet at a queue based at least in part on the packet drop probability and a predetermined flow rejection threshold.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

The present invention provides an admission control scheme for TCP flows which uses packet drop rates computed by an active queue management algorithm (AQM) for making flow admission decisions. The proposed scheme is simple to implement and dramatically improves delay and loss experienced by users.

The TCP admission control scheme of the present invention does not require additional measurement or accounting mechanisms beyond those needed for the AQM. In addition, packet drop probabilities generated by an AQM algorithm used in the TCP admission control scheme represent accurate estimates of actual packet loss rates. The packet drop probabilities reflect actual traffic behavior and provide simple measurable and controllable quantities for admission control purposes. Further, the use packet drop probabilities for admission control provides simplicity and an ability to deal with a source that may not be accurately characterized. The present invention allows admission control to be built on top of an AQM scheme. The present invention provides a tight integration of AQM into TCP admission control.

The present invention provides an admission control scheme for TCP flows that may use AQM capabilities to detect when a network is overloaded. The proposed AQM scheme may use a feedback control algorithm to randomly discard packets with a load-dependent probability when a buffer in a network becomes congested. Over a wide range of load levels, the present invention may stabilize a router queue occupancy at a target level independent of the number of active TCP connections. This is desirable since most AQM schemes are difficult to tune/configure, have unpredictable behavior, and do not stabilize router queues at levels independent of traffic load. The TCP admission control scheme of the present invention may be deployed, for example, in web switches, access switches, routers or gateways, or in other network devices with periods of sustained traffic congestion.

Figure 1:
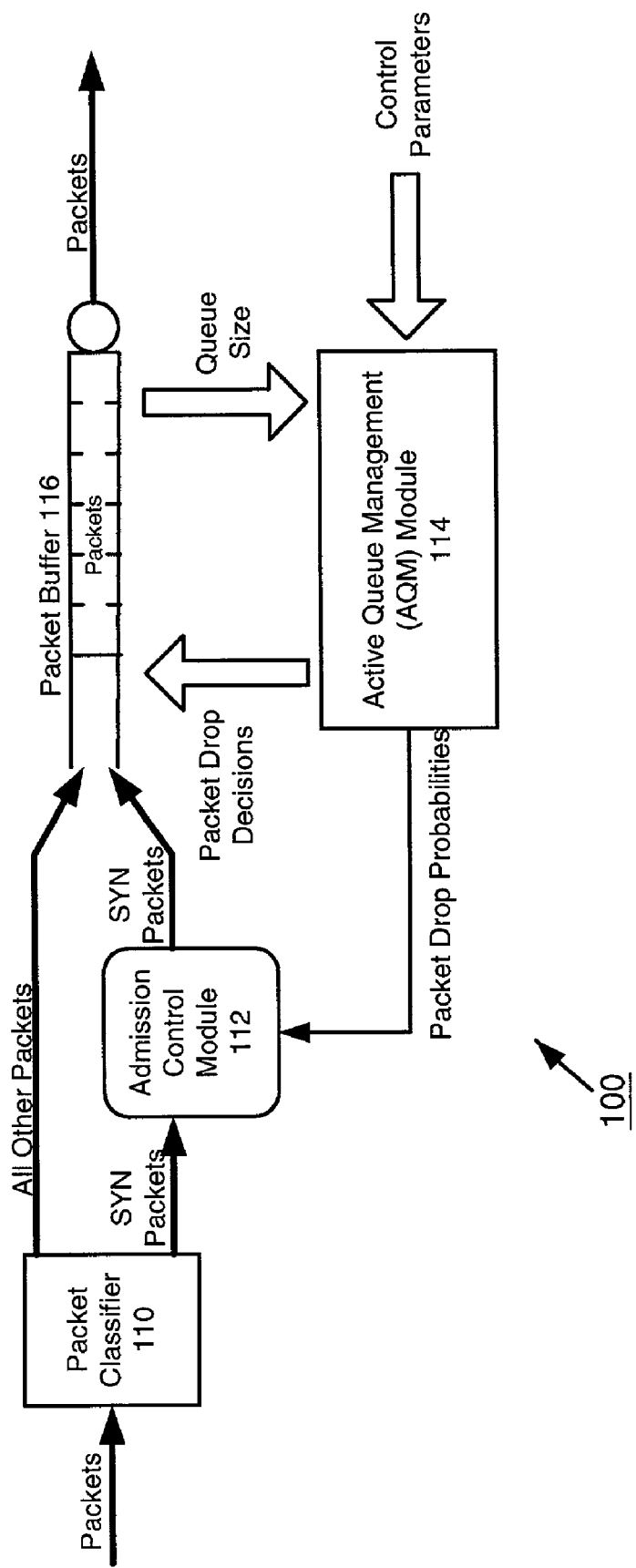
FIG. 1 is a system for supporting an admission control scheme in accordance with the present invention.

FIG. 1 is a diagram of an admission control scheme in accordance with the present invention. System 100 of the present invention comprises a packet classifier 110 for separating TCP SYN packets (which may include SYN acknowledgement packets (ACK), SYN/ACK packets) from other data packets. The TCP SYN packets may be passed through an admission control module 112 where the SYN packets may be rejected or accepted depending on packet drop probabilities of a queue in packet buffer 116. AQM module 114 generates, based on measurements in queues in packet buffer 116 and control parameters, packet drop probabilities that may be used to reject (e.g., drop) or accept packets arriving at the queue. In addition, AQM module 114 may pass packet drop probabilities to admission control module 112 to throttle new TCP flows. The packet drop probabilities may reflect the state of system 100 and give an indication of a potential impact on existing flows of an admission of another flow.

Figure 2:
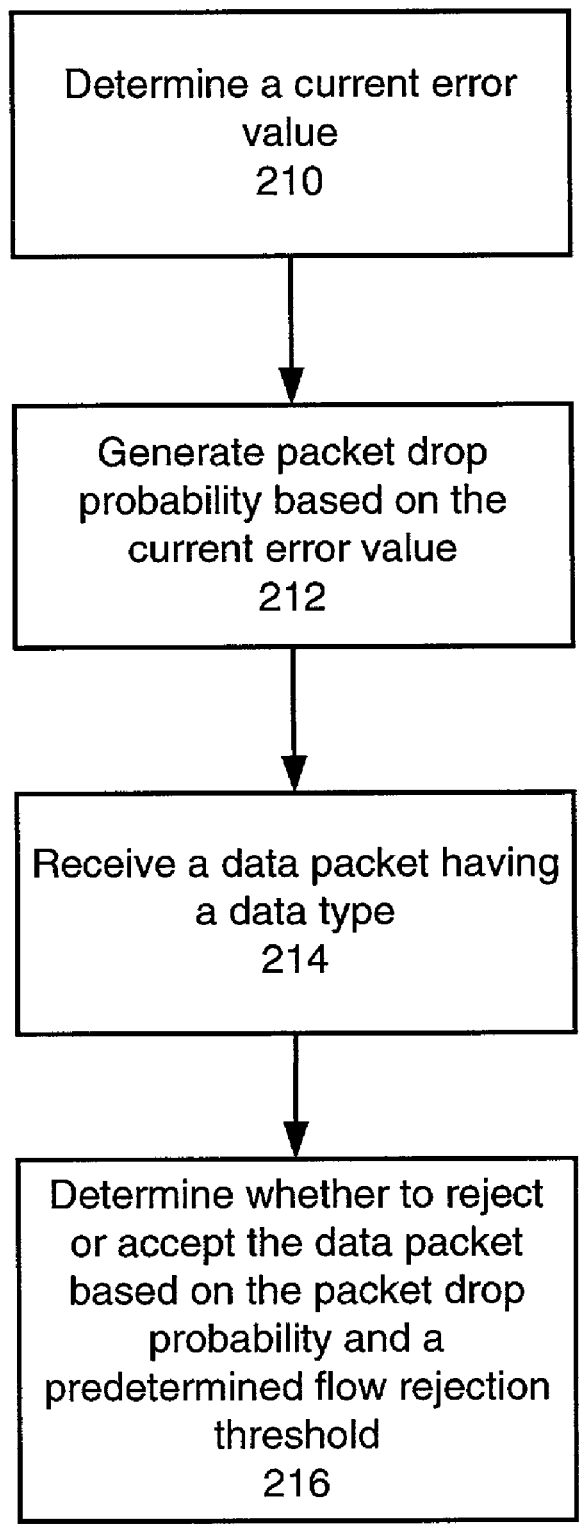
FIG. 2 is a flowchart illustrating an admission control scheme in accordance with the present invention.

FIG. 2 is a flowchart illustrating an admission control scheme in accordance with the present invention. At step 210, a current error value may be determined in response to a queue size in a packet buffer. The current error value may be defined as a difference between an actual queue size and a predetermined queue threshold. At step 212, a packet drop probability may be generated based at least in part on the current error value. At step 214, a data packet having a data type may be received. At step 216, whether to reject or accept the received data packet at the queue may be determined based at least in part on the packet drop probability and a predetermined flow rejection threshold.

Figure 3:
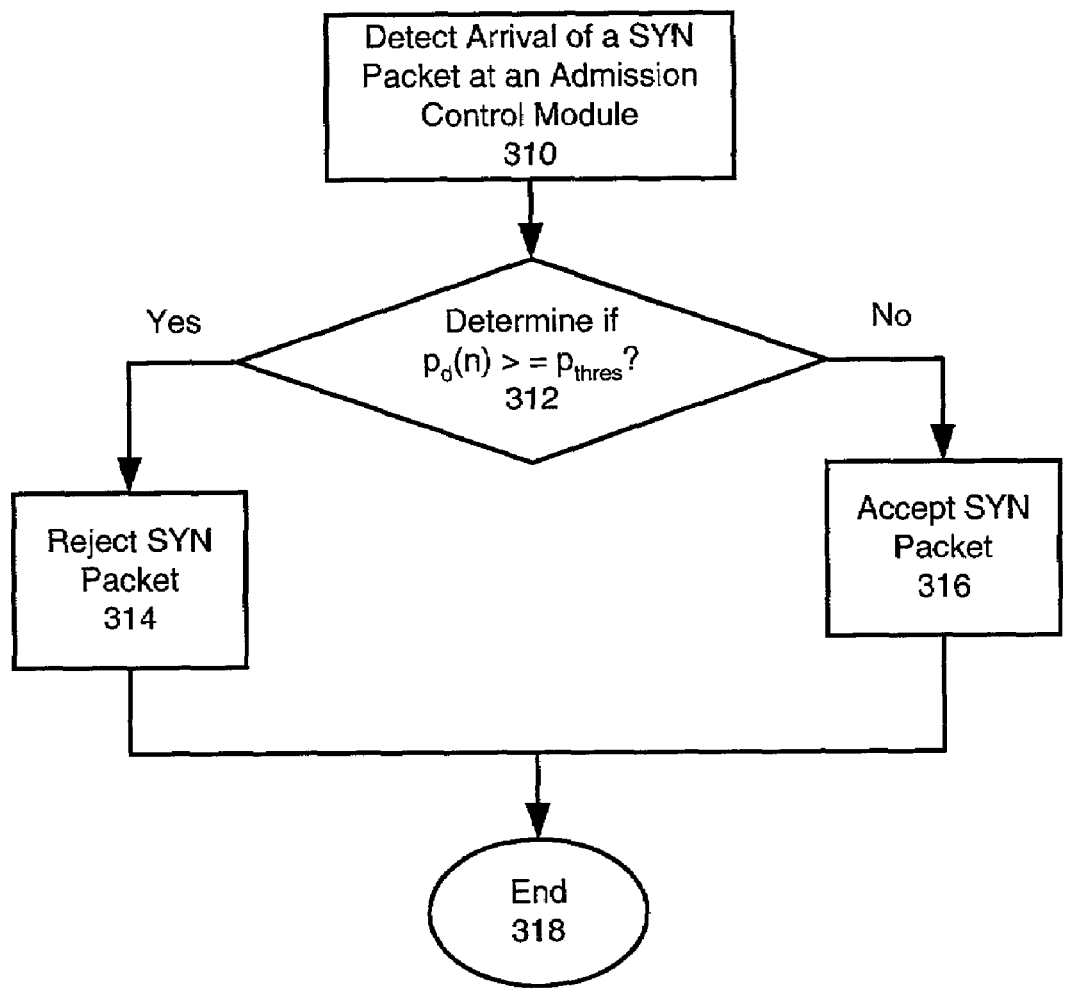
FIG. 3 is a flowchart for a TCP admission control process in accordance with the present invention.

FIG. 3 is a flowchart illustrating an admission decision process of a packet in accordance with the present invention. At step 310, an arrival of a packet (e.g., a TCP SYN packet) may be detected. At step 312, it may be determined whether a drop probability $p_d(n)$ (or a filtered drop probability $\hat{p}_d(n)$) is greater than or equal to a predetermined flow rejection threshold. If so, the packet may be rejected (e.g., dropped) at step 314. If not, the packet may be accepted, at step 316. Step 318 represents an end of the admission decision process.

A TCP packet with a SYN flag set (e.g., TCP SYN packet) may be used to indicate an opening of a TCP connection. By capturing the SYN (or SYN/ACK packets), an admission control module may intercept connection setup requests. Although the scheme of the present invention has been described in the context of dropping TCP SYN segments, it has broader application. For example, TCP connection reset (RST) packets may be sent to end systems and/or various networks. In another example, SYN packets may be allowed through a system when conditions are favorable (e.g., packet drop probabilities are less than a predetermined flow rejection threshold $p_{thres}$). Preferably, packet drop probabilities may be filtered, for example, using an exponentially weighted moving average filter, $\hat{p}_d(n)=(1-\eta)\hat{p}_d(n-1)+\eta p_d(n)$, $0<\eta<1$, before comparison with a predetermined flow rejection threshold $p_{thres}$.

The predetermined flow rejection threshold $p_{thres}$ may be set to a suitable value or may be roughly estimated based on approximations. An average loss rate may be approximated by $$l = \frac{0.76}{w^2},$$

where w is an average window size that TCP may use when faced with a particular average loss rate l. For example, N TCP connections may share a bottleneck link with a queue limited to T packets. TCP window sizes may sum to T, giving w=T/N. Substituting w into the above equation gives the following approximate loss rate prediction $$l = \frac{0.76N^2}{T^2}.$$

This loss rate may represent a loss rate seen by TCP when establishing a per-connection share of a bottleneck storage. Thus, the above expression may serve as a guide for estimating $p_{thres}$.

In another example, a network operator (or other user) may change the predetermined flow rejection threshold $p_{thres}$ from time to time to change operating conditions, such as user delays, packet loss rates, etc. For example, a higher $p_{thres}$ may mean more connections will gain access to a network, but experience lower service quality. On the contrary, a lower $p_{thres}$ may mean fewer connections will gain access to the network, but experience higher service quality.

An AQM module 114 may use a simple feedback control approach to randomly discard packets with a load-dependent probability when a buffer in a network device becomes congested. The AQM module 114 may maintain an average queue size close to a predetermined queue threshold, while allowing transient traffic bursts to be queued without unnecessary packet drops.

The AQM module 114 may be implemented as a mechanism for congestion control (e.g., controlling a queue size) at a line interface of a network device. The AQM algorithm may control congestion by randomly dropping packets with a probability $p_d$, which may constitute a signal to applications (e.g., TCP sources) to reduce their sending rate. The AQM algorithm may determine whether to drop or accept an incoming packet so that a queue occupancy level may be kept at a predetermined target level, thereby eliminating buffer underflow and overflow as much as possible.

An actual queue size in a network device may be sampled every $\Delta t$ units of time (e.g., seconds), and an AQM algorithm may provide a new value of a drop probability $p_d$ every $\Delta t$ units of time. Therefore, $\Delta t$ may represent a sampling/control interval of the system.

For example, $q(n)$ may denote an actual queue size and $T(n)$ may represent a target buffer occupancy, at discrete time n, where n=$1\Delta t$, $2\Delta t$, $3\Delta t$, . . . . A drop probability $p_d$ which may be implemented to drive a queue size to this target buffer occupancy may be determined. Thus, $p_d$ may be adapted to react to actual queue dynamics experienced at a node using a simple control mechanism. For example, if the actual queue size q is smaller than a predetermined queue threshold T, $p_d$ may be decreased to make aggressive usage of available resources, and vice versa if the actual queue size is high.

A goal of the AQM algorithm may involve adapting $p_d$ so that a magnitude of an error signal $$e(n)=q(n)-T(n)$$

is kept as small as possible. Due to burstiness of network traffic and other perturbations, this error signal may be highly fluctuating, so that a low pass filter may be desirable.

A first part of the AQM algorithm may involve a discrete-time first-order low-pass filter with gain $0<\beta<1$. A filtered error signal may be represented by $$\hat{e}(n)=(1-\beta)\hat{e}(n-1)+\beta e(n).$$

A second part of the AQM algorithm may involve an incremental adaptation of the drop probability $p_d$ proportional to the filtered error signal, as represented by $$p_d(n)=p_d(n-1)+\alpha\hat{e}(n),$$

where $\alpha$ is a control gain. For example, $p_d(n)$ may be bounded by $0 \leq p_d(n) \leq 1$, for all n. A basic recursion $p_d(n) = p_d(n-1)+\alpha e(n)$ implements a standard summation or integral control scheme since $\Delta p_d(n)=p_d(n)-p_d(n-1)=\alpha e(n)$ or $$p_d(n) = \alpha \sum_{i=0}^{n} e(i),$$

in discrete-time (and $dp_d(t)/dt=\alpha e(t)$ or $$p_d(t) = \alpha \int_{0}^{t} e(\tau) d\tau,$$

in continuous-time).

According to an example of the present invention, a normalized error signal may be used, resulting in a control equation $$p_d(n) = p_d(n-1) + \alpha \frac{\hat{e}(n)}{2T(n)},$$

where term $2T(n)$ may serve as a normalization parameter. In addition, filtering the error signal $e(n)$ may be considered equivalent to filtering a sampled queue size $q(n)$ for constant T. Thus, the control equation may also be expressed as $$p_d(n) = p_d(n-1) + \alpha \left[ \frac{\hat{q}(n) - T}{2T} \right],$$

where $\hat{q}(n)$ denotes a filtered queue size. Filtering of the error signal $e(n)$ or queue size q may allow traffic bursts to be queued without being unnecessarily discarded. Congestion may be detected by comparing an average queue size to a pre-determined queue threshold. In effect, the average queue size may be controlled to allow transient traffic bursts to be accommodated in the queue.

Parameters that may affect control performance may include a sampling interval $\Delta t$, control gain $\alpha$, filter gain $\beta$, control target T and a "no drop" threshold L. Sampling interval $\Delta t$ may represent a time interval for taking measurements and applying computed $p_d$ controls, e.g., $\Delta t$=10 packet transmission time. Control gain ($\alpha$) may control a reaction speed and stability of a control system. A recommended value when measurements are done on a packet by packet basis may be $\alpha$=0.00005. Filter gain ($\beta$) may control a reaction speed of a filter. A recommended value may be $\beta$=0.002. Control target (T) may set an average buffer utilization level and an average queuing delay, since the average queue size may evolve around the control target. A buffer size B may be allocated to connections or flows anticipated in the system. "No-drop" threshold (L) may represent a threshold lower than T, below which no packets are dropped even though $p_d$ may be greater than zero. This threshold helps to maintain high link utilization and keeps the average queue size around the target level. L may be a little lower than T, e.g., L=bT, b$\in$[0.8, 0.9]. A recommended value is L=0.9T.

Figure 4:
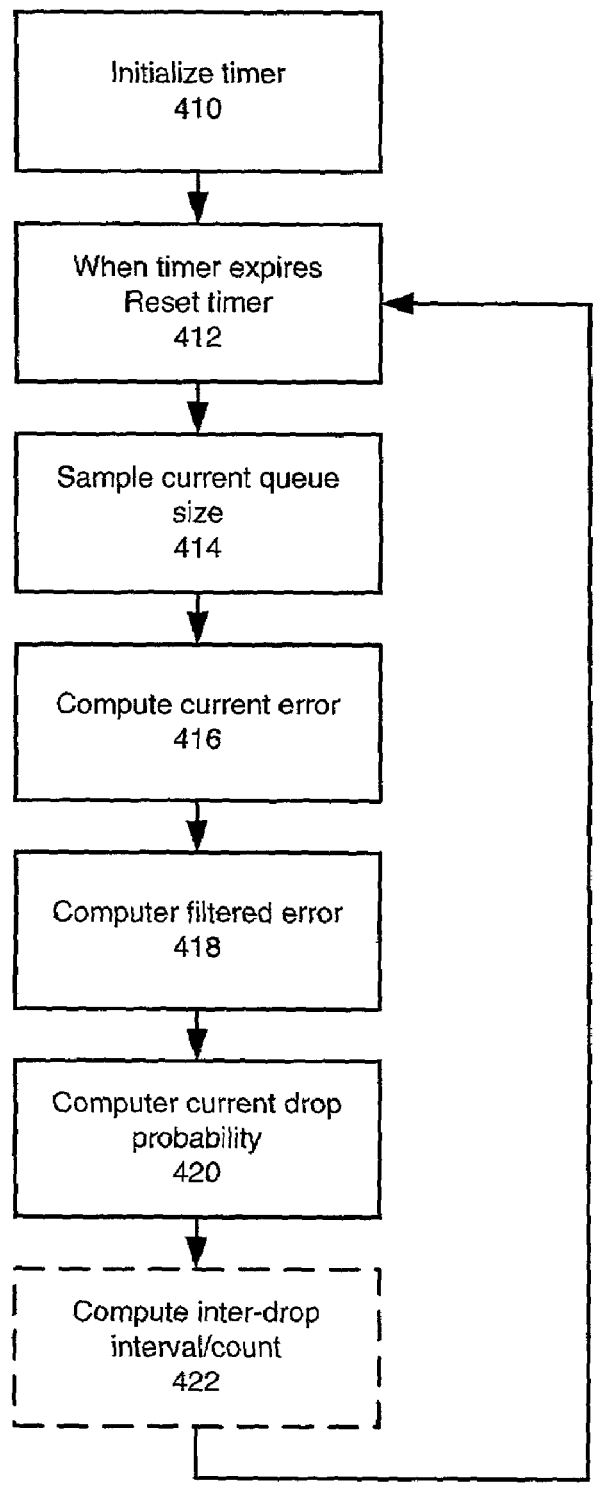
FIG. 4 is a flowchart for computing packet drop probabilities in accordance with the present invention.

FIG. 4 is a flowchart for computing drop probabilities in accordance with the present invention. FIG. 4 also includes a computation of an inter-drop intervals/counts (described in further detail below) if this drop technique is adopted.

At step 410, at discrete time n equal to zero, a timer may be initialized to Δt, $p_d(n)$ may be set to a suitable initial value, and ê(n) may be set to zero. At step 412, when the timer expires, the timer may be reset to Δt. In addition, n may be incremented as n=n+1. At step 414, queue size q(n) may be sampled. At step 416, current error signal may be computed using a current queue threshold T(n), as represented by e(n)=q(n)−T(n). At step 418, a filtered error signal may be computed, as represented by ê(n)=(1−β)ê(n−1)+βe(n). Otherwise, an error signal may be represented by ê(n)=e(n). At step 420, current drop probability may be computed by:

$$p_d(n) = \min\left\{\max\left[p_d(n-1) + \alpha \frac{\hat{e}(n)}{2T(n)}, 0\right], \theta\right\}.$$

An upper bound on the drop probability may be introduced by selecting an appropriate limit, such as θ≦1. The drop probability $p_d(n)$ may be used until discrete time n+1, when a new $p_d$ may be computed again at step 420. In addition, ê(n) and $p_d(n)$ may be stored for use at discrete time n+1.

If an inter-drop interval/count approach is to be applied, an inter-drop interval/count may be computed by $D_1(n)=\lfloor 1/p_d(n) \rfloor$, at step 422.

According to an embodiment of the present invention, drop probabilities $p_d(n)$ may be used to accurately approximate an average loss rate l(n). In particular, the AQM algorithm of the present invention may provide accurate estimates of actual packet loss rates. For example, A packets may arrive at a queue at time interval Δt. To stabilize a queue size at a queue threshold T with drop probability $p_d(n)$, the AQM algorithm may drop $p_d(n)$.A worth of packets out of a total of A arrivals. This may result in an actual loss rate of l(n)=$p_d(n)$.A/A=$p_d(n)$. The AQM algorithm may be employed in a TCP admission control scheme as a mechanism for packet loss rate monitoring. This monitoring mechanism may also output loss rate data needed for other network management purposes without having to explicitly estimate loss rates from packet arrivals and drop patterns.

Figure 5:
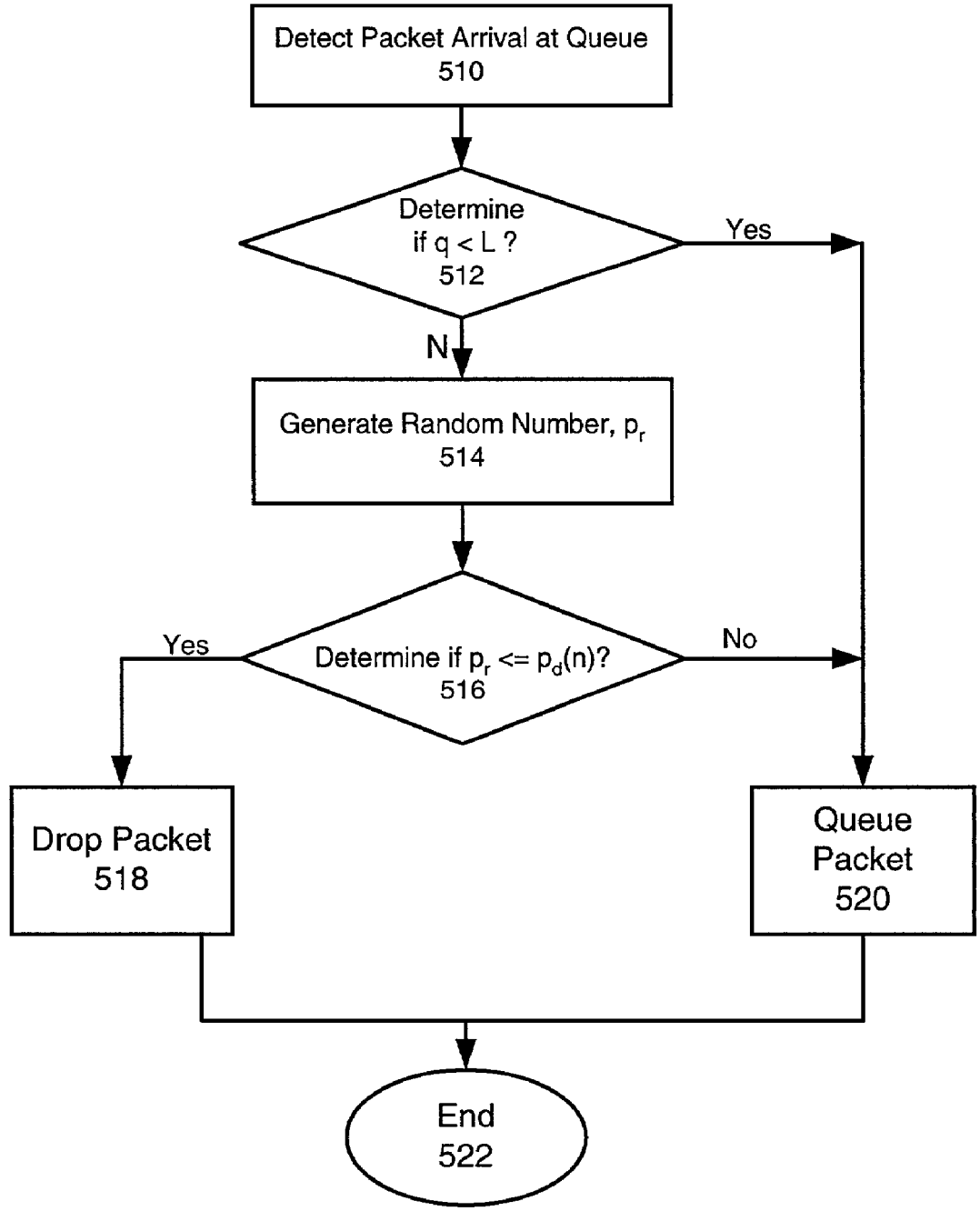
FIG. 5 is a flowchart for a packet drop routine in accordance with the present invention.

According to an embodiment of the present invention, at least two mechanisms for dropping packets at a queue may be implemented. For example, a random number generator and an inter-drop interval/count based approach may be implemented. FIG. 5 illustrates a packet drop process using a random number generator in accordance with the present invention. A decision to accept or drop an incoming packet in the random number generator may be based on an outcome of a comparison of a randomly generated number $p_r \in [0,1]$ and the drop probability $p_d$.

At step 510, a packet arrival at a queue may be detected. At step 512, it may be determined whether a queue size is less than a predetermined "no drop" threshold as represented by q(n)<L. If so, the incoming packet may be accepted, at step 520. If not, a random number generator may be implemented at step 514. At step 516, it may be determined whether a randomly generated number is less than or equal to a drop probability as represented by $p_r \in [0,1] \leq p_d$. If so, the incoming packet may be dropped, at step 518. If not, the incoming packet may be accepted at step 520. Step 522 represents an end of the random number generator based process.

Parameter L (e.g., L<T) may be introduced in the AQM process as shown in FIG. 5 to help maintain high link utilization and keep a queue size around a predetermined target level. For example, an AQM algorithm may not drop packets when q(n)<L in order to maintain high resource utilization and to not penalize sources which are in the process of backing off in response to (previous) packet drops. Generally, there is a time lag between the time a packet is dropped and the time a source responds to a packet drop. However, the computation of $p_d$ may nonetheless continue even if packet dropping is suspended (e.g., when q(n)<L).

Figure 6:
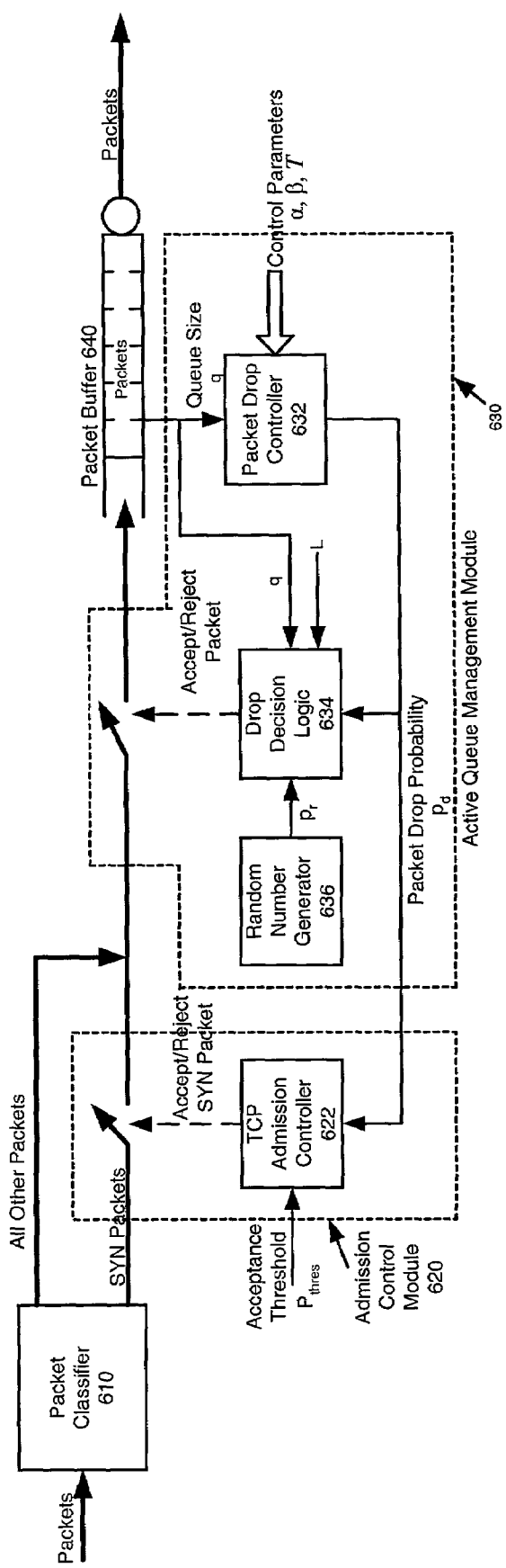
FIG. 6 is a diagram of a TCP admission control scheme with a random number generator in accordance with the present invention.

FIG. 6 is a functional block diagram of a TCP admission control scheme using a random number generator in accordance with the present invention. The admission control scheme of the present invention may be extended to multi-class queues (with fixed or variable service rates), where each queue may have its own control parameter settings and drop probability thresholds.

Packet classifier 610 may receive packets and separate SYN packets from all other packets. An admission control module 620 may include a TCP admission controller 622 which may receive a flow rejection threshold $p_{thres}$ and packet drop probability $p_d$ to determine whether to accept or reject a SYN packet. Active queue management module 630 may include a packet drop controller 632, drop decision logic 634 and a random number generator 636. Packet drop controller 632 may receive queue size q from packet buffer 640 and control parameters, which may include α, β and T, to generate packet drop probability $p_d$. Random number generator 636 may generate random numbers $p_r$. Drop decision logic 634 may receive a combination of queue size q, "no drop" threshold L, packet drop probability $p_d$ and random number $p_r$ to determine whether to accept or reject a packet into packet buffer 640.

An alternative to the random number generator based approach may include an inter-drop interval/count approach based on drop probability values. The use of a drop probability metric may provide a good indication of the amount of packets that should be dropped in order to achieve a given loss rate. As a result, an inverse of a drop probability value may indicate an interval in packets until a next packet drop. That is, the inverse of the drop probability may provide an inter-drop interval/count. For instance, for a drop probability $p_d$, the inter-drop interval/count $\lfloor 1/p_d \rfloor$ indicates that one out of every $\lfloor 1/p_d \rfloor$ packets should be dropped. This may be implemented in drop decision logic 834, of FIG. 8.

Figure 7:
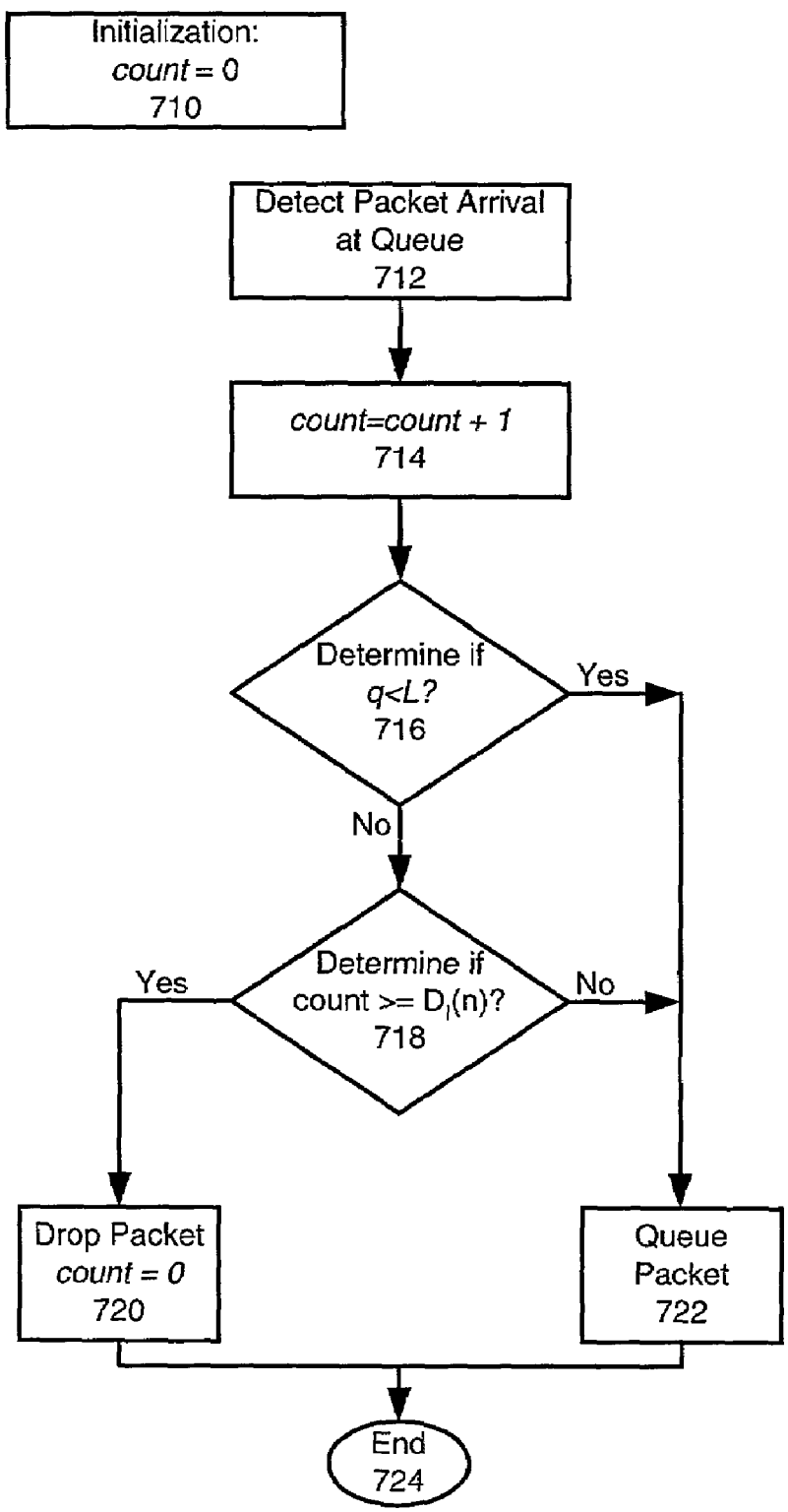
FIG. 7 is a flowchart for a packet drop routine in accordance with the present invention.

FIG. 7 illustrates a packet drop process at a queue using an inter-drop interval/count based approach in accordance with the present invention. At step 710, a variable count may be initialized as count=0. Step 710 may be executed once, during an initialization phase. At step 712, a packet arrival may be detected at a queue. At step 714, count may be incremented as count=count+1. At step 716, it may be determined whether queue size is less than threshold L, e.g., q<L. If so, the incoming packet may be queued, at step 722. If not, it may be determined whether count is greater than or equal to an inter-drop interval/count as represented by count≧$D_i(n)$, at step 718. If not, the incoming packet may be queued, at step 722. If so, the incoming packet may be dropped and count may be reset to zero, e.g., count=0, at step 720. Step 724 indicates an end of the inter-drop interval/count based approach.

Figure 8:
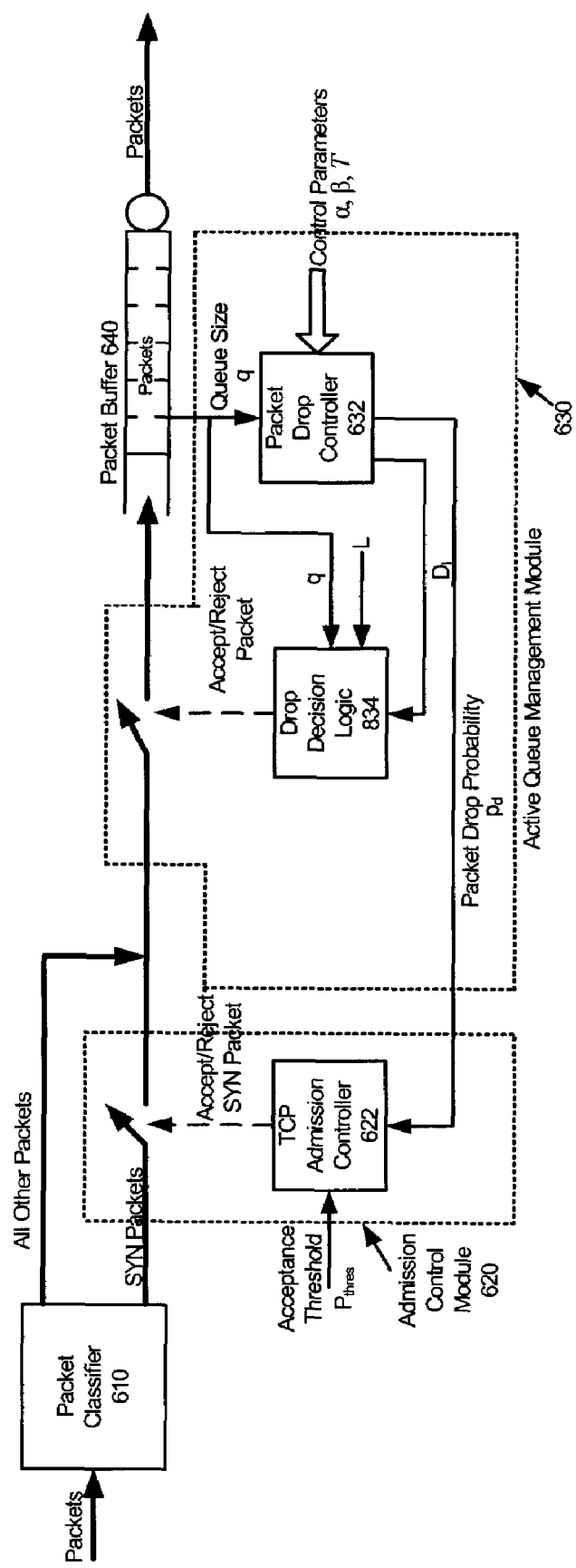
FIG. 8 is a diagram of a TCP admission control scheme with an inter-drop interval/count in accordance with the present invention.

FIG. 8 shows a functional block diagram of a TCP admission control scheme using an inter-drop interval/count approach in accordance with the present invention.

According to an admission control scheme of the present invention, each network node may use its own information (e.g., short-term packet drop history) to decide when to accept/reject new TCP flows. An AQM algorithm of the present invention which may be used as part of the admission control scheme may provide stabilized queues with high resource utilization and bounded queuing delays without maintaining per-connection state information. In addition, TCP sources do not have to explicitly signal the network to request access. For example, if every node on a connection path performs the admission control in an independent distributed fashion, then end-to-end admission control as in circuit switched may be achieved. Any node on a connection path may reject a connection during a connection setup phase.

There are some situations where TCP admission control may not be directly applied, e.g., if IP packet payload is encrypted (e.g., using IP Security (IPSec)). Also, SYNs and packets belonging to a flow may be required to follow the same path if the admission control scheme is to be effective. Thus, according to an embodiment of the present invention, the TCP admission control scheme may be viable for edge routers/switches/gateways (or other devices) where a given flow may generally follow the same route as its connection setup packet, as opposed to the Internet where the packets constituting a flow may take different routes during a lifetime of a flow.

According to an embodiment of the present invention, the admission control scheme may be implemented at an edge of a network. Currently, many networks characteristically implement high-speed links (e.g., Local Area Networks (LANs)) at the edge and lower-speed links (e.g., Wide Area Network (WAN)) at the core. This network scenario is usually implemented because of the current high cost of WAN bandwidth.

Networks may also include a hierarchy of devices, with numerous edge devices feeding into core switches and routers that, although fast, cannot handle the traffic that could be simultaneously generated at the edge. Traffic passing from a high-speed to a low-speed network section may be effectively handled by a device at a network boundary.

Congestion is likely to happen in these scenarios because traffic bottlenecks form at access links when a fast LAN pipe connects to a slower WAN link (e.g., terrestrial or satellite), which may cause multiple traffic sources to compete for limited capacity. An example may include two corporate LAN networks interconnected through a T1 link. With TCP admission control at the access points, traffic overload may be significantly minimized and the traffic sources are less likely to incur packet loss and retransmissions, thereby significantly improving the quality of service of end users.

The present invention provides an admission control scheme for TCP flows where packet drop rates maintained by an active queue management mechanism are used for admission control purposes. With this admission control scheme, users may receive the desired quality of service with bounded queue delays and packet loss rates. The admission control scheme ensures that throughput is maintained at a highest possible level by controlling traffic into the network when the resources (e.g., bandwidth, buffers, etc.) are approaching exhaustion. By controlling traffic before resources are exhausted, the chances of congestion collapse are minimized, and hence system sanity is guaranteed. Also, if admission control allows a user access into a network, the user will receive continuing priority access to network resources over new arriving users. This ensures that queuing delay and packet loss in the network are minimized, thereby ensuring the service is maintained at an acceptable level.

At this point it should be noted that a technique for implementing an admission control scheme for TCP flows in accordance with the present invention as described above typically involves the processing of input data and the generation of output data to some extent. This input data processing and output data generation may be implemented in hardware or software. For example, specific electronic components may be employed in a network device or similar or related circuitry for implementing the functions associated with the an admission control scheme for TCP flows in accordance with the present invention as described above. Alternatively, one or more processors operating in accordance with stored instructions may implement the functions associated the technique for implementing an admission control scheme for TCP flows in accordance with the present invention as described above. If such is the case, it is within the scope of the present invention that such instructions may be stored on one or more processor readable media, or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A method for implementing an admission control scheme for data flows, the method comprising the steps of:
   determining a current error value in response to a queue size in a packet buffer;
   generating a packet drop probability based at least in part on the current error value;
   receiving a data packet having one or more specified data types; and
   determining whether to reject or accept the received data packet at a queue based at least in part on the packet drop probability and a predetermined flow rejection threshold;
wherein the packet drop probability is used to control congestion associated with the queue.

2. The method of claim 1, wherein the one or more specified data types indicate an initialization of a data flow.

3. The method of claim 1, wherein the step of determining further comprises the step of:
   determining whether the packet drop probability is greater than or equal to the predetermined flow rejection threshold.

4. The method of claim 1, wherein the queue size is maintained at a predetermined queue threshold.

5. The method of claim 1, wherein the step of determining further comprises the step of:
   sending a signal to at least one source of the data packet to reduce an associated sending rate.

6. The method of claim 1, wherein the step of controlling further comprises the step of:
   determining whether a randomly generated number is less than or equal to the packet drop probability.

7. A method for implementing an admission control scheme for data flows, the method comprising the steps of:
  determining a current error value in response to a queue size in a packet buffer;
  generating a packet drop probability based at least in part on the current error value;
  receiving a data packet having a data type;
  determining whether to reject or accept the received data packet at a queue based at least in part on the packet drop probability and a predetermined flow rejection threshold; and
  using the packet drop probability to control congestion associated with the queue;
  wherein the step of controlling further comprises the step of:
    determining whether a count variable is greater than or equal to an inter-drop interval.

8. The method of claim 7, wherein the inter-drop interval comprises an inverse of the packet drop probability.

9. A system for implementing an admission control scheme for data flows, the system comprising:
  an active queue management module for determining a current error value in response to a queue size in a packet buffer and for generating a packet drop probability based at least in part on the current error value;
  a packet receiver for receiving a data packet having one or more specified data types; and
  an admission control module for determining whether to reject or accept the received data packet at a queue based at least in part on the packet drop probability and a predetermined flow rejection threshold.

10. The system of claim 9, wherein the one or more specified data types indicates an initialization of a data flow.

11. The system of claim 9, wherein the admission control module determines whether the packet drop probability is greater than or equal to the predetermined flow rejection threshold.

12. The system of claim 9, wherein the packet drop probability is used to control congestion associated with the queue.

13. The system of claim 12, wherein the queue size is maintained at a predetermined queue threshold.

14. The system of claim 12, wherein a signal is sent to at least one source of the data packet to reduce an associated sending rate.

15. The system of claim 12, further comprising:
  a random number generator for generating a random number; and
  a drop decision logic for determining whether the random number is less than or equal to the packet drop probability.

16. A system for implementing an admission control scheme for data flows, the system comprising:
  an active queue management module for determining a current error value in response to a queue size in a packet buffer and for generating a packet drop probability based at least in part on the current error value;
  a packet receiver for receiving a data packet having a data type; and
  an admission control module for determining whether to reject or accept the received data packet at a queue based at least in part on the packet drop probability and a predetermined flow rejection threshold;
  wherein an inter-drop interval is computed from the packet drop probability and the packet drop probability is used to control congestion associated with the queue; and
  a drop decision logic for determining whether a count variable is greater than or equal to the inter-drop interval.

17. The system of claim 16, wherein the inter-drop interval comprises an inverse of the packet drop probability.

18. A computer readable media for implementing an admission control scheme for data flows, comprising:
  computer program code to determine a current error value in response to a queue size in a packet buffer;
  computer program code to generate a packet drop probability based at least in part on the current error value;
  computer program code to receive a data packet having a data type; and
  computer program code to determine whether to reject or accept the received data packet at a queue based at least in part on the packet drop probability and a predetermined flow rejection threshold.

* * * * *